US009068375B2

(12) United States Patent
Hinkel

(10) Patent No.: US 9,068,375 B2
(45) Date of Patent: Jun. 30, 2015

(54) DIGITAL ACCESS CONTROL SYSTEM

(75) Inventor: Ralf Hinkel, Hoeringen (DE)

(73) Assignee: MOBOTIX AG, Winnweiler (DE)

( * ) Notice: Subject to any disclaimer, the term of this patent is extended or adjusted under 35 U.S.C. 154(b) by 208 days.

(21) Appl. No.: 13/386,246

(22) PCT Filed: Jul. 26, 2010

(86) PCT No.: PCT/DE2010/000866
§ 371 (c)(1),
(2), (4) Date: Apr. 24, 2012

(87) PCT Pub. No.: WO2011/009449
PCT Pub. Date: Jan. 27, 2011

(65) Prior Publication Data

US 2012/0200387 A1 Aug. 9, 2012

(30) Foreign Application Priority Data

Jul. 24, 2009 (DE) ........................ 10 2009 034 731

(51) Int. Cl.

| | |
|---|---|
| ***G06K 19/00*** | (2006.01) |
| ***E05B 47/00*** | (2006.01) |
| *E05B 17/00* | (2006.01) |
| *G07C 9/00* | (2006.01) |

(52) U.S. Cl.
CPC ......... *E05B 47/0046* (2013.01); *E05B 17/0083* (2013.01); *E05B 2047/0057* (2013.01); *G07C 2009/00634* (2013.01)

(58) Field of Classification Search
CPC .......................... G07C 9/00182; G06K 7/0008
USPC ............ 340/10.3, 5.61, 541, 5.25, 660, 5.71, 340/328; 705/14.1; 716/133; 70/213; 363/74; 382/115; 700/295; 307/143
See application file for complete search history.

(56) References Cited

U.S. PATENT DOCUMENTS

| | | | | |
|---|---|---|---|---|
| 5,881,588 A * | 3/1999 | Schmidt | .......................... | 70/213 |
| 6,411,199 B1 * | 6/2002 | Geiszler et al. | .............. | 340/10.1 |
| 8,058,970 B2 * | 11/2011 | Mullet et al. | ................. | 340/5.71 |
| 2003/0151493 A1 * | 8/2003 | Straumann et al. | .......... | 340/5.25 |

(Continued)

FOREIGN PATENT DOCUMENTS

| | | |
|---|---|---|
| DE | 196 41 592 | 4/1998 |
| DE | 197 38 938 | 7/1999 |
| DE | 199 36 961 | 2/2001 |
| DE | 199 49 453 | 3/2001 |
| DE | 20 2006 011 160 | 1/2008 |
| FR | 2 865 059 | 7/2005 |
| WO | 2007 059764 | 5/2007 |
| WO | 2008 011657 | 1/2008 |

OTHER PUBLICATIONS

International Search Report Issued Dec. 3, 2010 in PCT/EP10/00866 Filed Jul. 26, 2010.

*Primary Examiner* — Benjamin C Lee
*Assistant Examiner* — Israel Daramola
(74) *Attorney, Agent, or Firm* — Oblon, McClelland, Maier & Neustadt, L.L.P.

(57) ABSTRACT

A digital access control system including an input mechanism which can be operated from an unprotected area and a barrier which opens in response to operation of the input mechanism, wherein an energy store for supplying the barrier with opening power and a communication line for communication with a remote unit in the secure area are provided and the energy store is in a form of a low voltage buffer store and, for supplying power to the low voltage buffer store, a low voltage communication line is provided which has an associated low voltage Power Over Ethernet unit or an associated unit from a similar standard.

13 Claims, 1 Drawing Sheet

(56) References Cited

U.S. PATENT DOCUMENTS

2004/0178889 A1* 9/2004 Buckingham et al. ........ 340/328
2005/0114815 A1* 5/2005 Correale et al. ................ 716/10
2007/0133240 A1* 6/2007 Manders et al. ................ 363/74
2008/0265023 A1* 10/2008 Nassimi ........................ 235/382
2009/0153306 A1* 6/2009 Stobbe ....................... 340/10.31
2009/0184835 A1* 7/2009 Deaver et al. ................. 340/660
2009/0201143 A1* 8/2009 McKenna et al. ............. 340/506
2009/0308116 A1 12/2009 Lambrou
2011/0004513 A1* 1/2011 Hoffberg ..................... 705/14.1
2011/0148633 A1* 6/2011 Kohlenberg et al. .......... 340/541
2012/0218076 A1* 8/2012 Zacchio ....................... 340/5.61

* cited by examiner

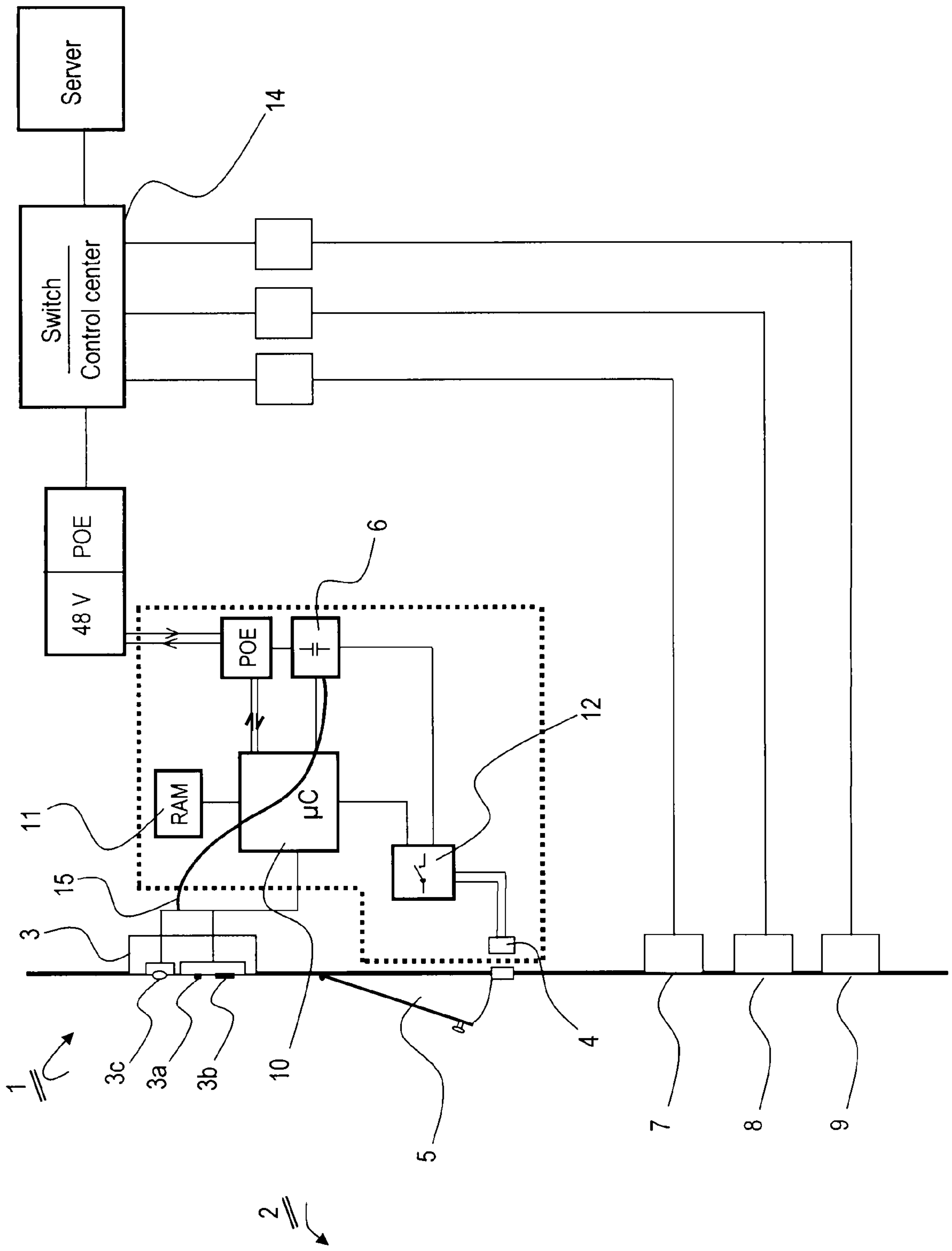
Server
14
Switch
Control center
POE
48 V
POE
6
RAM
μC
11
15
3
12
3c
3a
3b
10
5
4
7
8
9
1
2

DIGITAL ACCESS CONTROL SYSTEM

The present invention relates to the subject matter claimed as preamble and accordingly concerns digital access control systems.

Access control systems are used to control the access to a locked area. The conventional, mechanical keys are replaced in digital control systems by access codes to be input using keypads, transponders, etc., retinal identification, identification by means of fingerprints, etc.

Access is afforded in such systems when the result of a comparison between the digital signal obtained, be it in the form of a code that has been input manually or using RFID technology, determination of particular parameters from fingerprints, etc., and previously stored values is that access is intended to be afforded. In this case, a barrier such as a doorway or the like can be opened.

Typically, the opening involves the use of doors or the like with an electromagnetic latch bolt, in the case of which an electromagnet has current applied to it in order to open a latch bolt, as a result of which a doorway, a portal, a gate, a pale gate or the like can be pushed open.

Particularly complex systems accomplish this by using a central control unit to which signals from the input means in the unlocked area are supplied in order to afford access in the event of a successful comparison of the input digital access code with the stored codes. This is a simple possibility when it is possible to provide a current which is sufficient to excite the electromagnetic latch bolt. The same problems also arise in the case of simpler systems in which access is afforded, that is to say the code is evaluated, in the unprotected area.

However, there are frequently instances in which the security of an existing installation needs to be improved without great complexity. This often means that no dedicated lines must be strung, as a result of which typically only a two-wire line is available, in particular.

DE 197 38 938 A1 discloses a lock, preferably a mortise lock for doors with an electrically operable bolt which has an electronic control unit provided for the purpose of controlling it. Access to the room protected in this manner is intended to be afforded to a person who is carrying a previously enabled transponder. The control unit is intended to wirelessly send information about the operating state of the lock to an external relay station, as well as wireless commands for unlocking and locking the bolt or for enabling particular transponders. The lock needs to be able to be installed without having to put cable connections into the door. It is proposed that a storage battery be provided for supplying power to a bolt-operating motor and for the electronic control, said storage battery being intended to be supplied with power by means of a transmission transformer, the primary side of which is connected to the lighting network. It is also proposed that data signals be overlaid on the power supply system at a frequency which can be isolated from the system frequency. The data signals are intended to be arranged in a relay station which is isolated from the lock.

DE 20 2006 011 160 U1 discloses a domestic intercom system having at least one door opener which can be controlled remotely from at least one terminal in the domestic intercom system via an air interface or by wire, wherein an air interface—associated with at least one portable or fixed identification unit—to a unit provided remotely from the door opener in the domestic intercom system is provided, and wherein the identification unit has at least one identification device which can used to identify a user as authorized or unauthorized and/or the user can input identification data identifying him as authorized and/or the user can be identified as authorized using an identification medium identifying the user as authorized and the door opener can be controlled remotely using the identification unit via the air interface associated therewith only on the prerequisite of positive identification of the user as authorized. Power is intended to be supplied in the form of a battery or a storage battery, without any indication of how a storage battery could be charged.

The object of the present invention is to provide novel subject matter for industrial application.

The way in which this object is achieved is claimed in independent form. Preferred embodiments can be found in the subclaims.

According to a first aspect of the present invention, a digital access control system having an input means which can be operated from the unlocked area and a barrier which opens in response to operation of the input means is therefore proposed, wherein a low voltage buffer store for supplying the barrier with opening power is provided.

The present invention has recognized that the electrically operated barrier can be supplied with power from the low voltage buffer store despite its typical demand for high currents. In this context, the invention provides for the low voltage buffer store to be supplied with power directly or indirectly via a power supply which is similar or identical to POE (Power Over Ethernet), and at the same time the digital circuits in the access control system may also need to be supplied with power via such a power supply in normal mode; in such a case, the low voltage buffer store is used exclusively for supplying power for opening the door in normal mode; alternatively, it is possible for the digital circuits, also, to be supplied with power from the low voltage buffer store in continuous mode. In such a case, only the low voltage buffer store needs to be connected to a POE-like line and all other circuits, etc., receive their power from this low voltage buffer store. It should be mentioned that particularly the Mx2wire standard from the applicant allows simultaneous communication between digital appliances and a power supply via a two-wire line and is preferred for purposes of the present invention; to this extent, a standard similar to POE is seen in MX2wire; otherwise, it is also possible for power to be supplied using what is known as the MxBus from the applicant. In the present case, direct supply of power from the low voltage buffer store is understood to mean when the low voltage buffer store is connected by means of lines directly to a remote power supply, for example arranged in a domestic engineering center; indirect supply of power is understood to mean a situation in which another element of the access control system receives power from a domestic engineering system and connects this electric power through to the low voltage buffer store. In particular, it is possible to connect the camera on the door to the domestic engineering system, as a result of which the camera on a door or a portal or on a pale gate receives power, and the camera is provided with an output which can be used to supply power to other elements of the digital access control system. This arrangement is advantageous because cameras are often supplied with power via POE circuits; in this context, a typical POE power supply is designed such that a point-to-point connection exists to which, at the supply end, power is supplied only if appropriate consumer-end terminating resistors are recognized. If a direct supply of power to the low voltage buffer store is desired, it is possible to interpose a POE-compatible switch or hub; however, in this regard it is preferred to retain the point-to-point connection and then to communicate with the individual elements of the access control system via power-carrying lines. In this case, it is usually possible for the communication speed to be chosen to be lower than on the POE-type lines between access control system and a remote domestic engineering system or the like. It should be pointed out that it is possible to use power from a load in the access control system, particularly a camera—supplied with power via a POE-type point-to-point connection to a domestic engineering system—for other elements such as burglary sensors, motion sensors, microphones, etc. Typically, the camera with the POE-type energy source will negotiate the supply of power and then forward said power to downstream loads—possibly, and, in particular, preferably, via another bus system.

In a situation in which no power is obtained from the POE-type unit in such a system, one preferred variant may involve either the whole digital access control system being supplied with power via the low voltage buffer store or only selected elements being supplied with power. It is possible, depending on the low voltage buffer store filling level, for increasingly more loads to be gradually disconnected from the power supply or for other measures for saving power in the event of a relatively long absence of a supply of power to be provided. At least in an emergency mode, the low voltage buffer store accordingly supplies power not only to the barrier but also typically, either to the input means which can be operated from the unprotected area and/or to the evaluation means—typically arranged in the locked area—for the access codes which are input on the input means. The low voltage buffer store is preferably designed such that it can produce high current pulses for opening a barrier for a short period of time.

Within the context of the present invention, operation of the input means is understood to mean any facilitation of communication between the input means and a user; this may be keying-in of a secret number, the presentation of an optically or electromagnetically readable identification card or the bringing-close of an RFID tag, the scanning-in of biometric data, such as fingerprints, etc.

The input means will typically and preferably be connected to an assembly arranged in the protected area, where either the evaluation of an input access code and/or the conditioning of such a code for it to change with a control center takes place.

However, it should be pointed out that the evaluation of an input access code may possibly also take place within the unprotected area; thus, by way of example, it is possible to arrange a digital camera in the unprotected area and to perform at least some of the evaluation in the camera using the existing camera processors. In such a case, it may also be possible to set up the connection to a control center via the camera, which is particularly advantageous when networkable cameras are used. In such a case, provision is typically made for a code for storing access-permitting code in the protected area to be provided; this is not imperative, however, but rather only particularly preferred. It should be pointed out that access codes can typically be transmitted in encrypted form and, in particular, the encryption can also be changed, to which end it is possible to use cryptographical methods which are known per se, for example encryption by rolling code. This makes it difficult to gain access falsely by eavesdropping on the communication taking place via the lines.

It is accordingly possible, as one alternative, for there to be local storage of which codes result in the passage being opened, that is to say which input secret numbers, codes scanned using RFID or optically, are intended to afford access, etc.; it should be mentioned that this may possibly involve a control installation having been deposited so as to afford access to particular users not all of the time, but rather only at particular times or, by way of example, when other persons are in the locked area. Alternatively and/or in addition, conditioning can take place in order to transmit the captured access codes to a control center. This conditioning may comprise encryption, conversion to other communication protocols, amplification for communication over relatively long distances along a prescribed wire line, etc.

It is not absolutely necessary for an assembly to which the input means is connected to be in integral form and/or to have essentially all parts arranged on a common board, even though this is explicitly preferred in order to facilitate integration, for example for installation in flush boxes.

In one preferred variant, the assembly will have at least one microcontroller, a memory, in which accepted keys and/or last successful accesses, including the access time and an indication of the code used for access or an indication of the user thereof, and/or appropriate data from unsuccessful access attempts can be stored. It should be pointed out that particularly when the times of successful and/or unsuccessful accesses are intended to be stored, a timer will be provided. This timer may be implemented using existing local oscillators, by radio clock systems, etc. In addition, the assembly will preferably comprise a power supply unit and an interface for communication with a remote, typically central, unit. It should be pointed out that it is possible for communication with other access blocks and local intelligence provided therein also to be set up in complex systems. Thus, by way of example, other gates may have a signal transmitted to them which is used to indicate that the user of a particular access code has just entered a protected area; in such a case, this access code can be blocked on other gates until the relevant user has left the area again or a particular time has elapsed; this increases security against misuse of the code to a substantial degree. This may merely require the provision of a hub or switch at some location, said hub or switch being able to be used for communication by the plurality of the units. The use of a central unit, which should be mentioned as typical, is preferred when access to a relatively large building or area can be controlled centrally, as is the case in relatively large industrial complexes with a porter, for example, or in high-rise office blocks. In large residential buildings with a multiplicity of parties, however, it may be preferred to provide largely local controls to be accessed. Essentially, any tenant or owner of a residence will in this case himself wish to control to whom he would like to afford access to the building via an access code. To this end, each residence owner can be advised of a personal identification number which permits him to assign one-off or repeated, in particular permanent, admissible access codes. It is then merely necessary to ensure that users—possibly determined by an administration—are permanently blocked, for example when a tenant moves out of the building, in order to simultaneously block all codes which these users had prescribed as admissible and to prevent said tenant from further access.

It is preferred if the low voltage buffer store is supplied with power via a communication line which is also used for communication between a local controller and a local and a remote, in particular central, unit. In one preferred embodiment, the low voltage buffer store is supplied with power from a POE (Power Over Ethernet) unit or the like. It should be pointed that POE (Power Over Ethernet) units are known from the prior art; moreover, it is not imperative to use a power supply which complies exactly with the POE standard.

It should furthermore be pointed out that conventional door buzzers or other units used for opening doors are supplied with twelve volts and one amp as standard. The POE standard can be used to transmit up to 48 volts; if the power supplied via the POE-like unit has a significantly higher voltage than the voltage which is required for operating a closer, provision may be made for the low voltage buffer store to be designed such that—in the supply situation, that is to say when it is receiving power—it has a plurality of series-connected elements which are connected in parallel for the purpose of operating a door closer. In such a case, it is particularly preferred if the low voltage buffer store operates exclusively the closer or the access block in normal mode, while the digital circuits are otherwise supplied with power not via the low voltage buffer store but rather directly via the POE-type line, for example. If the POE-type power supply then fails, it is possible to change over to permanent parallel connection of the individual low voltage buffer store cells, as a result of which the digital circuits are not loaded by extreme sudden voltage changes and it is also not necessary to use any voltage-lowering voltage controller.

It should be pointed out that, for the purposes of the present invention, an Ethernet line based on the conventional Ethernet standard is not absolutely necessary. On the contrary, a single multiwire line, typically just a two-wire line, will often suffice in order to be able to successfully implement the present invention; in such a case, in accordance with the techniques which are known from the POE application, one and the same line can be used both for communication and for supplying power.

In one particularly preferred embodiment, the barrier is an electromagnetic latch bolt, as is typically called a "door buzzer", which can be excited for the purpose of opening a passage. It is preferred if the period of the latch bolt operation or the like for opening the passage is dependent on the filling level of the low voltage buffer store; the buffer store thus does not need to be designed for continuous operation of the electromagnetic latch bolt; it merely needs to be able to produce short, sufficiently high, impulses. As an alternative to an electromagnetic latch bolt, other closing and opening mechanisms which can be operated by electric power can be used. Thus, by way of example, a bolt which is operated by means of a linear motor can be used for locking and unlocking a door. The (re)charging can then take place continuously and slowly. In order to prevent the low voltage buffer store from running dry at peak times, for example at the start of work, when a large number of persons enter a building, it may make sense to shorten the period of operation so that the energy buffer store for low voltage power is not emptied to a particularly great extent. The low voltage buffer store used may be a capacitor and/or a storage battery, in particular, the latter being typically preferred.

The assembly or the like which is used to release the power to the low voltage buffer store will typically be located in the protected area and will otherwise and preferably also be designed so that, when a central unit fails and a plurality of units from the present invention are connected to one another in a complex system, it uses suitable protocols to negotiate, as appropriate, which unit will undertake the function of a bus master whenever a control center fails. If there is only one unit in the system which is capable of being a bus master, it is possible to dispense with negotiation. By using one unit as a bus master, it is possible to ensure, inter alia, that other units have, by way of example, information transmitted to them regarding which codes have already been used recently to access a locked area, so that these codes are, if necessary, blocked for some time so as to prevent misuse.

It is otherwise also possible to use a plurality of compenents, which can each be used as a bus master, within a digital access control system for the purpose of access control for precisely one access. Thus, typically, a digital camera which is equipped with particularly high processor power anyway will be able to act as a bus master, and only should it fail will another unit undertake the (bus master) function thereof so as to ensure that emergency access can still be ensured even if a complete camera system fails. It should be pointed out that it is possible for the present invention also to be able to be used to automate more complex door systems, particularly by virtue of a locking and unlocking function in addition to a passage opening function.

The invention is described below only by way of example only with reference to the drawing, in which:

FIG. 1 shows a schematic illustration of a digital access control system from the present invention.

According to FIG. 1, a digital access control system 1, denoted generally by 1, with an input means 3—which can be operated from an unprotected area 2—and a barrier 5 which opens in response to operation of the input means comprises a low voltage buffer store 6 for supplying power to the barrier 5 with opening power.

In the exemplary embodiment shown, the digital access control system 1 is implemented for the purpose of controlling passage through a gate, serving as a barrier 5, which blocks or opens the access from the unprotected area 2 to the protected area.

In the exemplary embodiment, the unprotected area 2 is separated from the protected area by a fence; the fence contains a plurality of comparable gates, which in this case are likewise all provided with an access control according to the present invention, cf. reference symbols 7, 8, 9.

In this case, the input means 3 comprises a bell button 3*a*, an RFID transponder 3*b* and a digital video camera 3*c* with a microphone and, if necessary, associated lamps.

The RFID transponder 3*b* is formed such that an RFID tag, which is carried by a person standing outside of the protected area close to the input means 3, can be read. The digital video camera 3*c* can sense a person close to the input means 3.

The operation of the bell 3*a*, the bringing of an RFID tag close to the RFID transponder 3*b* and the sensing of a video image by the camera 3*c* are regarded in the present case as operation of the input means 3.

In the embodiment shown, the input means 3 is supplied with low voltage power in the present case from the low voltage buffer store 6 via lines 15; this is not imperative, however, and it is readily possible to choose a refinement in which, in normal mode, all elements apart from the actual barrier are supplied with power not via the low voltage buffer store but rather via a POE-type line, for example.

The signals from the input means 3 are routed via lines and possibly after suitable conditioning to a microprocessor 10, which is in turn connected to a memory 11. The microprocessor 10 is also connected to a relay 12 and an interface 13 for the interchange of data with a control center 14 via a conventional two-wire bell line. Possible communication via such lines can take place on the basis of the Mx2wire standard, for example, which is known per se. In this case, the interface 13 is provided with drivers which allow signal transmission to the control center with sufficient bandwidth, particularly for the purpose of transmitting (compressed) video data from the video camera 3*c* and for the purpose of receiving access rules which the memory 11 is designed to store. In addition, inherently conventional timers, etc., are provided.

In the present case, the barrier 5 is provided with an electromagnetic latch bolt which, when the electromagnet is excited, opens the barrier. In order to control the excitation of the electromagnet, the illustration shows that a normally open relay 12 is provided in this case, which is designed to route current from the low voltage buffer 6 to the electromagnet 4 in the case of closing which can be controlled by the microcontroller 10. However, it should be pointed out that a relay which is shown for reasons of better illustration will typically be replaced by nonmechanical units, and instead of a relay it is possible to use a MOSFET or other suitable transistor switch, for example.

It should also be pointed out that, typically, in the case of door openers, operation is linked to buzzing which is twice the power supply system frequency, for example. The reason for this is that conventional door openers are operated with alternating current. In one particularly preferred variant, the currents supplied from the low voltage buffer store to the door openers are therefore pulsed. This therefore results in a pulsed current, which is sufficient firstly to operate the known door openers and secondly—which is equally important—to signal to a user by the noise that the door can now be opened, in a manner to which he is accustomed from conventional doors. The use of a pulsed power supply has, moreover, the advantage that, possibly by varying the duty ratio when the on/off duty ratio is operated and/or the pulse duration is chosen, it is possible to perform energy optimization, particularly on the basis of a low voltage buffer store filling level.

In the present case, the low voltage buffer store 6 is in the form of a storage battery which can supply electrical power to the microcontroller 10, the memory 11, the input means 3 and, briefly, to the electromagnetic latch bolt. In order to charge the low voltage buffer store 6, the interface 13 is equipped with a functionality similar to Power Over Ethernet, as a result of which it is possible for limited currents to be supplied to the unit 13 by the control center from a 48 V supply voltage source supplied with power by the lighting system. The low voltage store 6 has an associated circuit which the microcontroller 10 can use to sense a present filling level; it should be mentioned that this can be accomplished by determining the voltage which is output by the low voltage buffer store 6 or by tracking the history of the instances of relay operation which are particularly intensive in terms of power, for example.

The control center contains a server which is used for managing the access codes which are to be stored in the individual access control stations 1, 7, 8, 9 and which receives video data, etc., from the stations so that the access can be managed centrally if required.

The access control system 1 of the present invention is arranged such that although it is possible to operate the operable input means 3 from the unprotected area, all elements are arranged in the protected area as far as possible. In this case, the digital access control system 1 is combined with the microprocessor 10, the memory 11, the relay 12, the interface 13 and the low voltage buffer store 6, where possible and preferably, but not absolutely necessarily, to form an assembly which can be integrated into a flush box (not shown).

The arrangement is used as follows:

First of all, the POE-like connection is used to charge the low voltage buffer store 6 from the control center, and access codes from RFID tags which, when sensed, are intended to open the barrier 5 are stored in the memory 11.

When an RFID tag is then brought close to the input means, the transponder 3*b* is used to request the code stored in the RFID tag and to compare it with the codes stored in the memory 11.

If the code sensed using the transponder is not stored in the memory 11, the time at which the invalid RFID tag was brought close to the transponder, and the code stored on the RFID tag, are stored.

If, by contrast, the code sensed using the transponder 3*b* is stored in the memory 11, the microcontroller 10 requests the filling level of the buffer store 6 and, on the basis of the filling level, closes the relay 12 in order to excite the electromagnetic latch bolt for a time sufficient to open the gate. If the filling level of the low voltage store is found to be too low in this case, the relay is excited for a shorter time than if the filling level is high.

If the input means, which can be operated from the unprotected area, is then operated by operating the bell button, a voice link is set up from the microphone of the video camera 3*c* via the interface 13 and the two-wire bell line to the control center 14 in order to allow communication in the manner of a conventional intercom system. At the same time, camera images are stored in the memory 11. If the result of the communication between the person operating the bell button 3*a* and a person in the control center is that the barrier 5 needs to be opened, an appropriate signal is supplied from the control center to the microcontroller 10, whereupon the latter, as described previously, opens the relay in order to open the electromagnetic latch bolt for a time which is dependent on the low voltage store filling level.

If, by contrast, the person in the control center is not certain whether or not access is to be afforded, for example because he does not know the voice of the person at the gate, he can request video images either from the memory 11 or images recorded live. In this case, if necessary, it is possible to resort to known compression methods, which means that just limited bandwidth on a two-wire line is also sufficient.

If the control center fails at a given time, it is nevertheless possible for the codes stored in the memory to be requested upon a further request to RFID tags. In addition, it is also possible for information about entry attempts to be stored.

It is pointed out that the exemplary embodiment described above discloses only one possible, rather than the only, implementation option. Thus, as explained by way of introduction, it is not absolutely necessary to provide a control center which can be used to afford access. On the contrary, an access control system from the present invention may also be designed such that the admissible codes are stored at the location of the digital control system itself. This is a particularly simple matter when the codes are stored in cameras which are provided for recording those persons who use the digital access control system. Such cameras typically have correspondingly powerful data processing. It should be mentioned that the camera—by virtue of the digital systems which are present therein—can therefore also undertake part of the communication with a user, so that it is possible to communicate bell operation via the connection of the camera, for example. This can be done using conventional or dedicated bus systems, with a first communication standard being able to be used for the communication between camera and peripheral device, such as bell key, and a different communication protocol being able to be used for the communication between camera and end user, that is to say a person who determines entry. It is also possible for images recorded live to be transmitted immediately in this case, provided that the bandwidths are sufficient for this purpose, which is possible.

The invention claimed is:

1. A digital access control system comprising:

user input circuitry which operates from an unprotected area to control access to open a barrier;

the barrier which, during normal operation, is supplied with barrier passage opening power that is a first voltage from a low voltage buffer to operate the barrier to clear access via the barrier in response to operation of the user input circuitry; and a buffer store filling level sensor, wherein the digital access control system is connected to a control center via transmission lines, the transmission lines serving both as communication lines for communication between the control center and the digital access control system and as power supply lines for supplying a second voltage, wherein said second voltage is different from said first voltage, and said communication includes interactions between the user input circuitry and the control center, wherein the digital access control system receives, from the control center via said transmission lines, the second voltage, wherein, during normal operation, the low voltage buffer supplies energy only to the barrier, and the digital access control system variably controls an opening period of the barrier based on a sensed buffer store filling level.

2. The digital access control system as claimed in claim 1, wherein the input circuitry is connected to a component in a protected area, the component including at least a microcontroller, a memory, the low voltage buffer, and an interface for communicating with the control center, supplies energy intermittently from the low voltage buffer to the barrier, and undertakes a function of a bus master for communication with other units of the digital control system.

3. The digital access control system as claimed in claim 2, wherein the low voltage buffer supplies power to at least one of the input circuitry and the component at least during an emergency.

4. The digital access control system as claimed in claim 3, wherein the component includes the memory, the memory being for accepted keys and/or last accesses and/or access attempts with and/or without access times.

5. The digital access control system as claimed in claim 1, wherein the barrier includes at least one of an electromagnetic latch bolt which operates to allow passage and a catch which is operated by a linear motor.

6. The digital access control system as claimed in claim 1, wherein the protected area includes an assembly to isolate the barrier passage opening power from the low voltage buffer for the barrier.

7. The digital access control system as claimed in claim 1, further comprising an appliance including input/output interfaces to automate access to door systems to output at least one of a door locking signal and a door closing signal.

8. The digital access control system as claimed in claim 1, wherein the digital access control system is installed in a flush socket.

9. The digital access control system as claimed in claim 1, wherein the digital access control system supplies emergency power to at least one of an input and a reception appliance.

10. The digital access control system as claimed in claim 1, further comprising transmitting circuitry to transmit encrypted information between units, of access codes, or to transmit with a rolling code.

11. The digital access control system as claimed in claim 1, wherein an interface connects the digital access control system and the control center via a two-wire line.

12. The digital control access system as claimed in claim 1, wherein the digital access control system further comprises a camera to receive the second voltage from the control center, and wherein the camera negotiates with a POE (Power Over Ethernet) energy source for supply of energy and relays the energy to peripheral devices.

13. The digital control access system according to claim 12, wherein the camera communicates with the peripheral devices via a bus system different from what the camera uses to negotiate with the POE energy source.

* * * * *